US008237607B2

(12) United States Patent
Merhav

(10) Patent No.: US 8,237,607 B2
(45) Date of Patent: Aug. 7, 2012

(54) TRACKING COORDINATOR FOR AIR-TO-AIR AND AIR-TO-GROUND TRACKING

(75) Inventor: Yahali Merhav, D.N. Hof Ashkelon (IL)

(73) Assignee: Elta Systems Ltd., Ashdod (IL)

( * ) Notice: Subject to any disclaimer, the term of this patent is extended or adjusted under 35 U.S.C. 154(b) by 0 days.

(21) Appl. No.: 12/811,137

(22) PCT Filed: Dec. 25, 2008

(86) PCT No.: PCT/IL2008/001673
§ 371 (c)(1), (2), (4) Date: Oct. 4, 2010

(87) PCT Pub. No.: WO2009/083967
PCT Pub. Date: Jul. 9, 2009

(65) Prior Publication Data

US 2011/0025549 A1 Feb. 3, 2011

(30) Foreign Application Priority Data

Dec. 31, 2007 (IL) ......................................... 188510

(51) Int. Cl.
*G01S 13/00* (2006.01)

(52) U.S. Cl. ............................... 342/33; 342/36; 342/61

(58) Field of Classification Search .............. 342/33–36, 342/61–62
See application file for complete search history.

(56) References Cited

U.S. PATENT DOCUMENTS

2006/0010443 A1 * 1/2006 Lahti et al. .................... 718/100

FOREIGN PATENT DOCUMENTS

EP 1 615 046 A1 1/2006
RU 2 188 436 C1 8/2002

* cited by examiner

*Primary Examiner* — Timothy A Brainard
(74) *Attorney, Agent, or Firm* — Oliff & Berridge, PLC

(57) ABSTRACT

A method and system for coordinating air-to-air tracking and air-to-ground tracking for an airborne tracked target that is landing or performing an airdrop. Air-to-air tracking data is analyzed to detect if the tracked target is landing, and a predicted landing location is computed. An air-to-ground sensor is activated, via a separate air-to-ground tracking module or via a mode change, and the air-to-ground tracking is initiated at the predicted landing location of a detected target. Both automated and manually-assisted air-to-ground activation are supported.

23 Claims, 5 Drawing Sheets

201 MISSION COMMAND CONTROL SYSTEM
203 AIR-TO-AIR TRACKING MODULE
207 AIR-TO-GROUND TRACKING MODULE
208 AIR-TO-GROUND SENSOR
205 AIR-TO-AIR DATA
209 AIR-TO-GROUND DATA
211 TRACKING COORDINATOR MODULE
213 A-A I/F
215 A-G I/F
217 PROCESSOR
219 PREDICTED AIR-GROUND DATA
221
• DEM DATA
• DSM DATA
• DTM DATA
• KNOWN LANDING SITE DATA
223 OPERATOR WORK STATION
225 OPERATOR

TRACKING COORDINATOR FOR AIR-TO-AIR AND AIR-TO-GROUND TRACKING

FIELD OF THE INVENTION

The present invention relates to the field of target tracking, and, in particular to a system and method for airborne target tracking.

BACKGROUND OF THE INVENTION

Air-to-air tracking radar systems, as exemplified by Airborne Early Warning (AEW) systems, and air-to-ground tracking radar systems, as exemplified by Ground Moving Target Indication (GMTI) and Synthetic Aperture Radar (SAR) systems, typically have different configurations and utilize different operating parameters, which are optimized for their respective domains. As a result, air-to-air tracking radar systems are generally ineffective in tracking ground-based targets. There are cases where an airborne target originally tracked via an air-to-air tracking system needs to be tracked on the ground after landing or after an airdrop.

SUMMARY OF THE INVENTION

There is a need in the art to maintain continuity in tracking a landing airborne target by providing a coordinated handoff from an air-to-air tracking system to an air-to-ground tracking system. The term "airborne" as used herein should be expansively construed to include denoting the status of an object which is aerodynamically supported above the earth's surface, including, but not limited to: flying objects and lighter-than-air buoyant objects; or whose descent to the earth's surface is aerodynamically moderated, by means including, but not limited to: parachutes and the like; and gliders. The term "landing" as used herein should be expansively construed to include denoting the descent to the earth's surface of an object, including but not limited to: airborne objects; and airdropped objects released from an airborne object.

A non-limiting example of such an application that maintains continuity in tracking a landing airborne target is detecting cross-border infiltration, illegal immigration, and/or smuggling via small aircraft. Aircraft used in such activities typically attempt landing and/or airdrop after crossing the border. Among advantages of certain aspects of the present invention is effective assistance in countermeasures against such illegal activities. Presently there is no way of automatically coordinating air-to-air and air-to-ground target tracking systems. Currently, even airborne tracking platforms which feature both air-to-air tracking and air-to-ground tracking capabilities do not integrate the two into a single unified system capable of maintaining continuity in tracking an airborne target that is landing or which is being airdropped. This is also true as well in multi-mode radar systems that support both air-to-air tracking and air-to-ground tracking applications.

The present invention provides a tracking coordinator for air-to-air and air-to-ground tracking systems and methods for coordinating air-to-air tracking with air-to-ground tracking.

In embodiments of the present invention, an air-to-air tracking module initially tracks an airborne target and provides air-to-air tracking data. If it is desired to track this target during and after landing or airdrop, the air-to-air tracking data is processed to detect a landing or airdrop condition and to compute predicted air-to-ground data including a predicted landing or airdrop zone, after which an air-to-ground tracking module is activated and provided with the predicted air-to-ground data. Thereafter, the air-to-ground tracking module acquires the target and handles the tracking thereafter.

References herein to activating an air-to-ground tracking module are understood to be equivalent to a radar tracking mode change from air-to-air tracking to air-to-ground tracking in multi-mode radar systems.

Tracking coordinators according to certain embodiments of the present invention are integrated, in part or in whole, into a Mission Command and Control system (MC2), an air-to-air tracking module, and/or an air-to-ground tracking module. The air-to-air tracking module and the air-to-ground tracking module may be aboard the same or different airborne observation platforms. Another embodiment of the present invention provides for a tracking coordinator that is a separate component integrated into a system including an air-to-air tracking module, and an air-to-ground tracking module.

In an embodiment of the present invention, the tracking coordinator operates automatically to coordinate air-to-air tracking with air-to-ground tracking. In another embodiment of the present invention, the tracking coordinator receives input from an operator via an Operator Work Station (OWS). In this embodiment, the operator provides target recognition functions and assists in tracking mode change.

DEFINITIONS

The term "tracked target" used in this patent specification should be expansively construed to include a movable object under current observation or which is desired to be under current observation.

The term "plot" regarding a tracked target used in this patent specification should be expansively construed to include position data of the tracked target with respect to the position of a specified observation platform from which the tracked target is being observed. Plot data can be expressed in terms such as, but not limited to: distance of the tracked target from the observation platform, azimuth (compass heading of the tracked target from the observation platform), and elevation angle (angle relative to the horizon from the observation platform).

The terms "track" and "tracking data" used in this patent specification should be expansively construed to include data indicative of the spatial coordinates and velocity vector of a tracked target and data derived therefrom. A series of plots may be processed to obtain a track or tracking data. Spatial coordinates can be expressed in terms such as, but not limited to: latitude, longitude, and altitude. A velocity vector can be expressed in terms such as, but not limited to: speed and direction.

The term "air-to-air tracking data" used in this patent specification should be expansively construed to include tracking data pertaining to an airborne tracked target as obtained from an airborne observation platform.

The term "air-to-ground tracking data" used in this patent specification should be expansively construed to include tracking data pertaining to a ground-based tracked target as obtained from an airborne observation platform.

The term "airborne tracking system" used in this patent specification should be expansively construed to include a system at least part of which is located aboard one or more airborne observation platforms—wherein air-to-air tracking and/or air-to-ground tracking may be performed.

According to the present invention there is provided an airborne tracking system including: (a) an air-to-air tracking module configured to obtain air-to-air tracking data of an airborne tracked target; (b) an air-to-ground tracking module configured to obtain air-to-ground tracking data of a ground-based tracked target; (c) a tracking coordinator module operatively coupled to the air-to-air tracking module and to the air-to-ground tracking module, and configured for: (i) obtaining the air-to-air tracking data; (ii) processing the air-to-air tracking data; and (iii) if a processed result thereof fits a predetermined air-to-ground tracking activation criterion, then: activating the air-to-ground module; and providing the air-to-ground module with data on a specified ground area, for obtaining the air-to-ground tracking data from the specified ground area.

In addition, according to the present invention there is provided, for use with an airborne tracking system including an air-to-air tracking module for obtaining air-to-air tracking of an airborne tracked target, and further including an air-to-ground tracking module having an air-to-ground sensor and configured for obtaining air-to-ground tracking data of a ground-based tracked target, a tracking coordinator module including: (a) an air-to-air tracking module interface operatively coupled to the air-to-air module and configured for obtaining from the air-to-air module air-to-air tracking data; (b) an air-to-ground tracking module interface operatively coupled to the air-to-ground module and configured for obtaining from the air-to-ground module air-to-ground tracking data; (c) a processor operatively coupled to the air-to-air tracking module via the air-to-air tracking module interface, and configured for: (i) processing the air-to-air tracking data into processed data; (ii) applying a predetermined air-to-ground tracking activation criterion to the processed data; (iii) if a processed result thereof fits a predetermined air-to-ground sensor activation criterion, then: activating the air-to-ground sensor via the air-to-ground tracking module interface; and providing the air-to-ground module via the air-to-ground module interface with data on a specified ground area, for obtaining the air-to-ground tracking data from the specified ground area.

Moreover, according to an embodiment of the present invention there is provided a method of automatically tracking a ground-based target after tracking an airborne target, the method including: (a) utilizing an air-to-air tracking module to obtain air-to-air tracking data of the airborne target; (b) utilizing a processor to process the air-to-air tracking data to obtain predicted air-to-ground tracking data; (c) automatically sending the predicted air-to-ground tracking data to an air-to-ground tracking module and activating the air-to-ground tracking module to track the ground-based target according to the predicted air-to-ground tracking data; and (d) utilizing the air-to-ground tracking module to obtain actual air-to-ground tracking data.

BRIEF DESCRIPTION OF THE DRAWINGS

The invention is herein described, by way of example only, with reference to the accompanying drawings, wherein.

DESCRIPTION OF THE EXEMPLARY EMBODIMENTS

Figure 1:
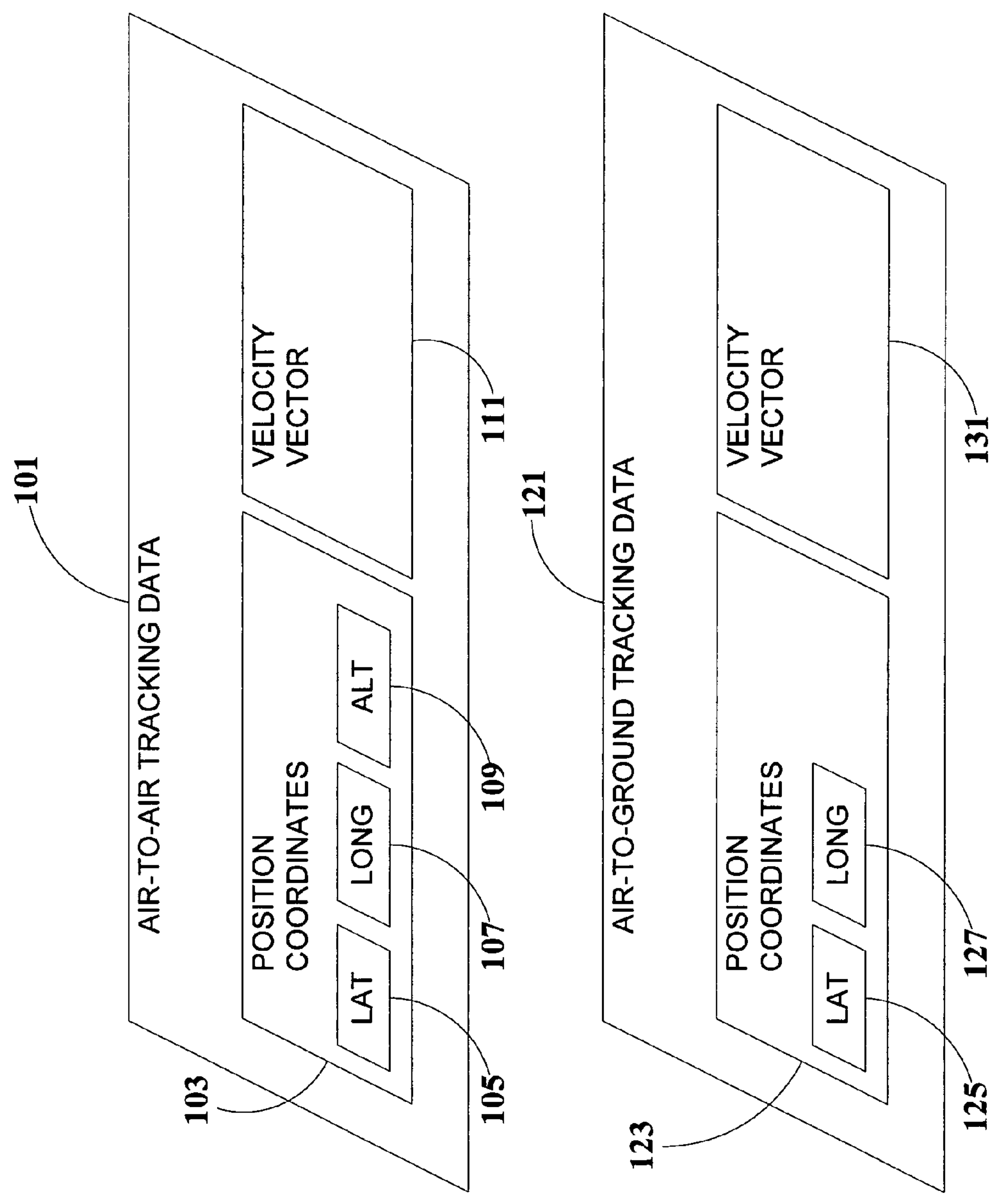
FIG. 1 conceptually illustrates the basic data elements of air-to-air tracking data and air-to-ground tracking data according to the prior art.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. In the drawings and description, identical reference numerals indicate those components that are common to different embodiments or configurations.

Unless specifically stated otherwise, as apparent from the following discussions, it is appreciated that throughout the specification discussions utilizing terms such as "processing", "computing", "calculating", "determining", "generating" or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as, processor, computer, apparatus, system, sub-system, module, unit, device (in single or plural form) for performing the operations herein. This may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, Disk-on-Key, smart cards (e.g. SIM, chip cards, etc.), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions capable of being conveyed via a computer system bus.

The processes/devices presented herein are not inherently related to any particular electronic component or other apparatus, unless specifically stated otherwise. Various general purpose components may be used in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The principles and operation of a tracking coordinator according to embodiments of the present invention may be understood with reference to the accompanying drawings and descriptions.

Tracking Data

FIG. 1 conceptually illustrates the basic data elements of air-to-air tracking data 101 and air-to-ground tracking data

121 according to the prior art. The discussion herein relates to the informational content of the data—the present invention does is not format-dependant, and therefore it is understood that any suitable data formats are usable therewith.

Air-to-air tracking data 101 includes position coordinates 103, exemplified by the non-limiting choice of a latitude 105, a longitude 107, and an altitude 109 as the coordinates. A velocity vector 111 is also included in air-to-air tracking data. It is understood that velocity vector 111 comprises a speed and a direction, expressible in any convenient coordinate system.

Air to ground tracking data 123 includes position coordinates 121, exemplified by the non-limiting choice of a latitude 125 and a longitude 127 as the coordinates. Many ground-based coordinate systems are restricted to two dimensions, with the omission of altitude. However, this is not necessary, and position coordinates 123 of air-to-ground tracking data 121 may also include an altitude coordinate. Air-to-ground tracking data also includes a velocity vector 131. It is likewise understood that velocity vector 131 comprises a speed and a direction, expressible in any convenient coordinate system.

Tracking Coordinator

Figure 2:
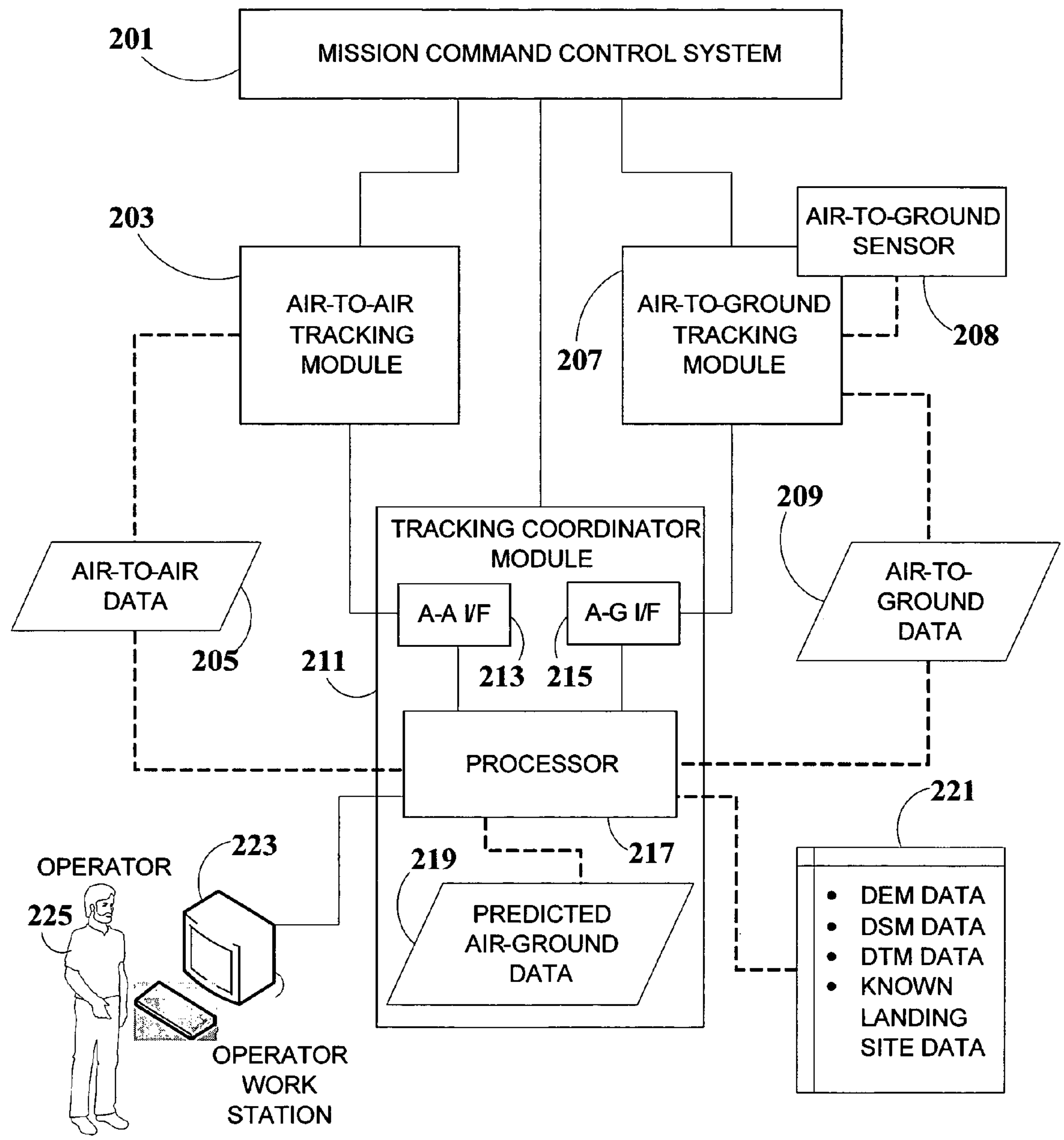
FIG. 2 is a block diagram illustrating a tracking coordinator for coordinating air-to-air tracking and air-to-ground tracking according to an exemplary embodiment of the present invention.

FIG. 2 is a block diagram illustrating a tracking coordinator module 211 for coordinating an air-to-air tracking module 203 and an air-to-ground tracking module 207 having an air-to-ground sensor 208 according to an exemplary embodiment of the present invention. (Some of the captions in the Figures have been abbreviated for compactness of representation.)

The term "air-to-air tracking module" used in this patent specification should be expansively construed to include any system capable of tracking an airborne target from a position aboard an airborne platform, including, but not limited to systems such as an Airborne Early Warning system (AEW). The term "air-to-ground tracking module" used in this patent specification should be expansively construed to include any system capable of tracking a ground-based target from a position aboard an airborne platform, including, but not limited to systems such as GMTI and SAR, wherein air-to-ground sensor 208 is suitably configured and equipped to support the appropriate data capture and acquisition.

Tracking coordinator module 211, air-to-air tracking module 203, and air-to-ground tracking module 207 may optionally be included within a Mission Command and Control (MC2) system 201.

Air-to-air tracking module 203 obtains and makes available air-to-air tracking data 205, and air-to-ground tracking module 207 obtains and makes available air-to-ground tracking data 209.

In an embodiment of the present invention, tracking coordinator module 211 includes an air-to-air tracking module interface 213; an air-to-ground tracking module interface 215; and a processor 217. It is understood that the foregoing components are logically included in tracking coordinator module 211, but may be physically located in other components of the system illustrated in FIG. 2. In a non-limiting embodiment of the present invention, for example, processor 217 may be physically located in air-to-air tracking module 203, and may also serve as a logical component thereof.

Processor 217 receives, as input, air-to-air tracking data 209. For an airborne target that is to be tracked during and after landing or airdrop, processor 217 computes predicted air-to-ground tracking data 219 based on air-to-air tracking data 209, making use of a landing zone database 221.

Landing zone database 221 contains data regarding prospective landing sites, and includes, but is not limited to:

digital elevation model (DEM) data—a digital representation of ground surface topography or terrain;

digital surface model (DSM) data—similar to DEM data;

digital terrain model (DTM)—generally a "bare earth" filtered version of the ground surface devoid of landscape features, a post-processed version of DEM; and Known landing site data.

It is noted that ground elevation is an important feature of a prospective landing site, and according to certain embodiments of the present invention, landing zone database 221 contains ground elevation data for prospective landing sites.

According to embodiments of the present invention, the system of FIG. 2 operates as follows:

When tracking an airborne target using air-to-air tracking module 203, tracking coordinator module 211 processes and evaluates air-to-air tracking data 208 against landing zone database 221 to determine whether the airborne target is attempting to land, or whether an airdrop is occurring. If this is the case, tracking coordinator module 211 determines a specified ground area (included in predicted air-to-ground tracking data) where the tracked target is predicted to land or where the tracked target airdrop is predicted to land, and then activates air-to-ground tracking module 207 to track the target when ground-based, in the specified ground area, and to provide air-to-ground tracking data 209.

The above determinations are made by tracking coordinator module 211 according to predetermined methods, functions, and criteria, as discussed in detail below.

In certain embodiments of the present invention, an Operator Work Station (OWS) 223 is connected to tracking coordinator module 211 via processor 217, to allow an operator 225 to interact with the system and provide services including, but not limited to: observation and monitoring of automatic system operation; manual assist of automatic operation; recognition services; identification services; and tracking mode change (from air-to-air tracking to air-to-ground tracking). In some embodiments which feature Operator Work Station 223, certain functions such as activating air-to-ground tracking are performed at least in part manually by operator 225 via Operator Work Station 223. In certain other embodiments of the present invention, however, such functions are performed automatically, without the need for active operator involvement.

In further embodiments of the present invention, tracking coordinator module 211 also reports air-to-ground tracking data from air-to-ground tracking module 207 back to air-to-air tracking module 203, as well as elsewhere, such as to Mission Command Control system 201. Air-to-ground tracking data provided in this manner can be used as feedback in a learning mode to increase the accuracy of predicting landing locations and airdrop locations, such as by statistical analysis of correction factors used in adjusting the predicted landing locations.

One embodiment of the present invention provides for a complete system including air-to-air tracking module 203, air-to-ground tracking module 207, and tracking coordinator module 211, configured as described above. Another embodiment of the present invention provides tracking coordinator module 211, as configured above, for use with a pre-existing air-to-air tracking module 203, and a pre-existing air-to-ground tracking module 207, which may be included in a pre-existing Mission Command Control system 201.

Air-to-Ground Tracking

In addition to incorporating radar systems ((including, but not limited to GMTI systems) into air-to-ground tracking module 207, some embodiments of the present invention provide for air-to-ground tracking module 207 to feature supplementary tracking and identification technologies including, but not limited to:

infrared tracking;

laser tracking;

television imaging;

image processing; and optical pattern recognition.

Imaging systems are useful in conjunction with the employment of Operator Work Station 223, as shown in FIG. 2 and previously discussed.

Those skilled in the art will readily appreciate that the invention is not bound by the configuration of FIGS. 1 and 2; equivalent functionality may be consolidated or divided in another manner. In different embodiments of the invention operative connections between the blocks and within the blocks may be implemented directly or indirectly, including remote connection.

Coordinating Air-to-Air Tracking and Air-to-Ground Tracking

Figure 3:
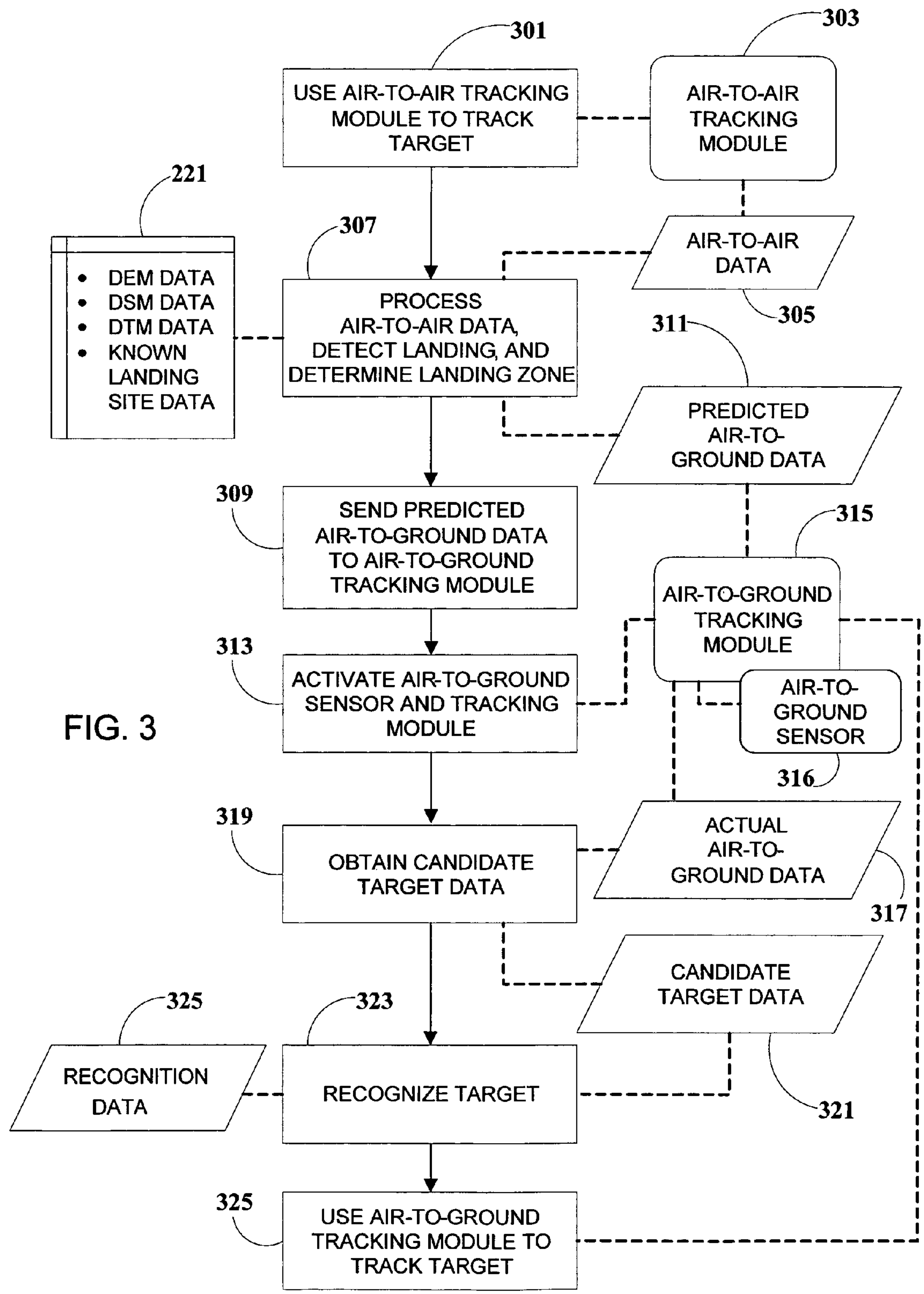
FIG. 3 is a flowchart of a method for coordinating air-to-air tracking and air-to-ground tracking according to an exemplary embodiment of the present invention.

FIG. 3 is a flowchart of a method for coordinating air-to-air tracking and air-to-ground tracking according to an embodiment of the present invention.

The method begins with a step 301, which uses an air-to-air tracking module 303 to track the airborne target and provide air-to-air tracking data 305. In a step 307, air-to-air data 305 is processed along with data from landing zone database 221 (see FIG. 2 and above description) to detect landing by the airborne tracked target, to determine the probable landing zone thereof, and to obtain predicted air-to-ground tracking data 311 corresponding to the target's predicted entry into the probable landing zone. As described elsewhere herein, the airborne target may be landing, or may be performing an airdrop. In certain embodiments of the present invention, if the airborne target is not landing, tracking of the airborne target continues, along with associated functions.

Other embodiments of the present invention provide for additional responses and processing of air-to-air tracking data, including, but not limited to:

computing one or more tracks for an airborne target, whether landing or not landing;

evaluating one or more tracks of the airborne target;

activating a high-precision mode for air-to-air tracking; and determining whether the target is suspected.

In an embodiment of the present invention, tracks are generated by Sensor Data Integration (SDI)

A target may be suspected on the basis of factors including, but not limited to:

Identification Friend or Foe (IFF) codes, responses, and/or data;

kinematics data;

input from operator 225 (FIG. 2 and previous discussion);

input from an external source, including, but not limited to ground radar.

having a track corresponding to a known flight plan;

having a track exhibiting abnormal characteristics;

having a track whose characteristics fit a predetermined profile;

being arbitrarily designated as suspected; or being considered suspected by default until established otherwise (i.e., all airborne tracked targets are considered suspected a priori).

In an embodiment of the present invention, it is a suspected airborne target whose air-to-air tracking data is analyzed to determine if the target is landing, and, if so, computing the predicted landing zone and air-to-ground tracking data.

In a step 309, predicted air-to-ground tracking data 311 is sent to an air-to-ground tracking module 315 with an air-to-ground sensor 316, and in a step 313 air-to-ground tracking module 315 is activated after air-to-ground sensor 316 has detected the target, where steps 309 and 313 may be performed simultaneously or in either order. Air-to-air tracking module 315 then obtains actual air-to-ground tracking data 317.

Next, in a step 319, actual air-to-ground tracking data 317 is analyzed to obtain candidate target data 321 on one or more candidate targets. In an embodiment of the present invention, the ground-based target is desired to be the same physical object as the airborne tracked target, and in this particular case step 319 is employed to take into account the possibility that predicted air-to-ground data 311 may not be specific enough to positively identify a ground-based target as being the same as the airborne target after landing. In addition, even if only a single target is identified, it may be prudent to confirm the identification. For this embodiment, therefore, in a step 323, the target is recognized according to recognition data 325. Recognition data 325 can be obtained from sources including, but not limited to: visual sighting; and correlation of air-to-air tracking data 305 with actual air-to-ground tracking data 317. In another embodiment of the present invention, the ground-based tracked target is not the same as the airborne tracked target. This is discussed in more detail in a following section, "Alternate Ground-Based Target".

Finally, in a step 327, air-to-ground tracking module 315 is used to continue to track the ground-based target.

Activation Delay

In an embodiment of the present invention, activation step 313 performs activation immediately. The term "immediately" herein denotes performing an action without introducing an intentional delay. In certain other embodiments of the present invention, however, activation step 313 performs activation in a manner involving a delay. Manners of introducing a delay according to these embodiments of the present invention include, but are not limited to: activating with a predefined or configurable delay time; and activating according to a predefined or configurable event. The term "configurable delay time" herein denotes that the delay time can be varied according to a function of data or other input information. The term "configurable event" herein denotes that the delay can be according to an event selected according to data or other input information. The terms "according to a predefined event" and "according to a configurable event" herein denote that activation is performed upon the occurrence of the event or after the occurrence of the event. Embodiments of the present invention provide for combinations of these aforementioned delays. In a non-limiting example, activation is performed after a predetermined delay starting when a predetermined event occurs.

The above options for activation are also applicable to air-to-ground tracking of alternate ground-based targets, as discussed in the following section.

Alternate Ground-Based Target

As previously noted, in an embodiment of the present invention, the ground-based target which is tracked using air-to-ground tracking is the same object which was previously the airborne tracked target. In this embodiment, the ground-based target tracked after tracking a landing airborne target is the same physical object as the landing airborne target.

In certain other embodiments of the present invention, however, the ground-based target tracked after tracking a landing airborne target is a different physical object from the previously-tracked landing airborne target. This is the case of interest where the payload of the airborne tracked target is transferred after landing to a surface vehicle. This is especially the case of interest for airdropped objects from airborne targets, because an airdropped object is essentially the payload of a tracked airborne target, and is tracked by embodiments of the present invention which provide air-to-ground tracking thereof, In these cases, an airdropped object typically has no inherent ability to move from one place to another after arriving on the ground, and therefore the surface vehicle to which the airdropped object is transferred is the tracked ground-based target. The term "surface vehicle" herein denotes a vehicle which travels on the surface of the earth and is tracked by air-to-ground tracking. Surface vehicles include, but are not limited to: wheeled and tracked vehicles, such as trucks, automobiles, vans, buses, trailers, tanks and similar transports, and the like; and water vehicles, such as boats, rafts, barges, ferries, ships, and the like.

For cases as discussed above, the landing/airdrop site is typically in a remote location where there are few, if any, other aircraft. This is what would be expected for illicit border crossings involving illegal immigration, smuggling of contraband, and covert operations. In these instances, the payload is expected to be transferred to a surface vehicle, and the ground-based target will be different from the just-landed airborne target. For landing/airdrop in such cases, it is likely that detected ground-based movement (distinct from the previously-tracked airborne target) that takes place after the airborne target has landed would be that of the new ground-based target which is to be subsequently tracked. Referring to the previous discussion of "Activation Delay", it is also to be expected that there would be a delay between landing of the tracked airborne target and the acquiring of the new ground-based target. A delay can arise for various reasons, including, but not limited to delays as the payload is transferred from the just-landed target aircraft to the surface vehicle.

Air-to-Ground Tracking Activation Criteria and Related Methods

Tracking coordinator module 211 (FIG. 2, and as described above) and the method of tracking coordination (FIG. 3, and as described above) involve activating air-to-ground tracking in a specified location according to certain predetermined criteria. Various embodiments of the present invention provide that such air-to-ground tracking activation criteria are related to factors including, but not limited to: likelihood that an airborne tracked target is landing; and likelihood that an airdrop is being made from an airborne tracked target. In the former case, the predicted air-to-ground tracking data includes a specified ground area corresponding to the predicted landing location, and in the latter case, corresponding to the predicted airdrop location, which is taken to be the location where the airdropped object from the airborne tracked target will descend upon the earth's surface.

Figure 4:
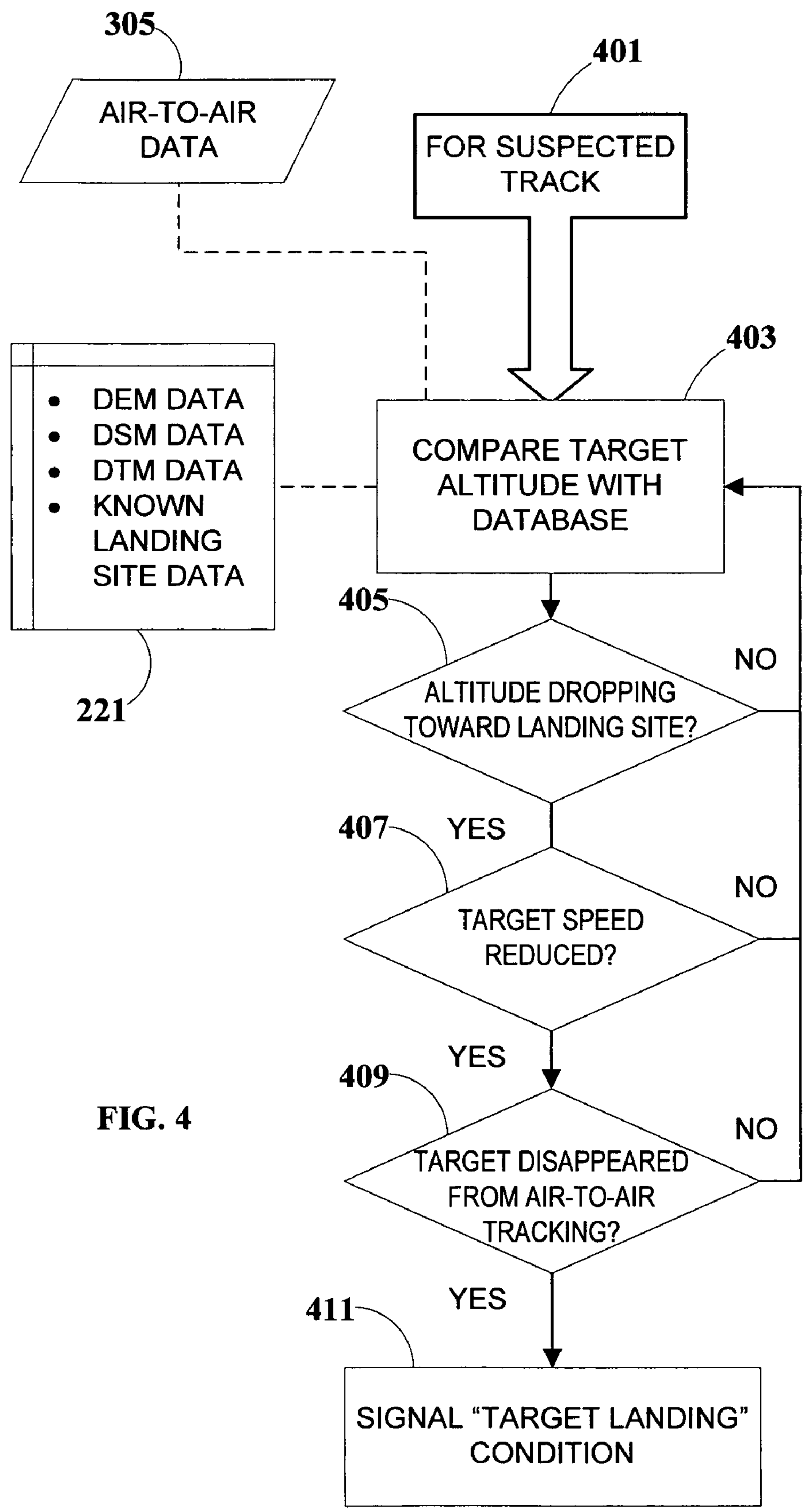
FIG. 4 is a flowchart of a method for detecting a landing condition of a tracked airborne target according to an embodiment of the present invention.

FIG. 4 is a flowchart of a method for detecting a landing condition of a tracked airborne target according to an embodiment of the present invention. For a suspected track 401, in a step 403 the target's altitude from air-to-air tracking data 305 is compared with data from landing zone database 221 (FIG. 2 and previous discussions). At a decision point 405, if the target's altitude is dropping toward the ground at a potential landing site, and then at a decision point 407 if the target's speed (from air-to-air tracking data 305) is reduced, and then at a decision point 409 if the target has disappeared from air-to-air tracking, then in a step 411, signal a "target landing" condition, indicating that the airborne target has a likelihood of landing. If any of decision points 405, 407, and 409 has a negative result, however, then continue with step 403.

It is noted that criteria for determining reduced speed at decision point 407 are different for low-speed targets than for high-speed targets. In an embodiment of the present invention, air-to-air tracking module 203 (FIG. 2) classifies targets according to their speed and uses different thresholds for determining reduced speed.

Figure 5:
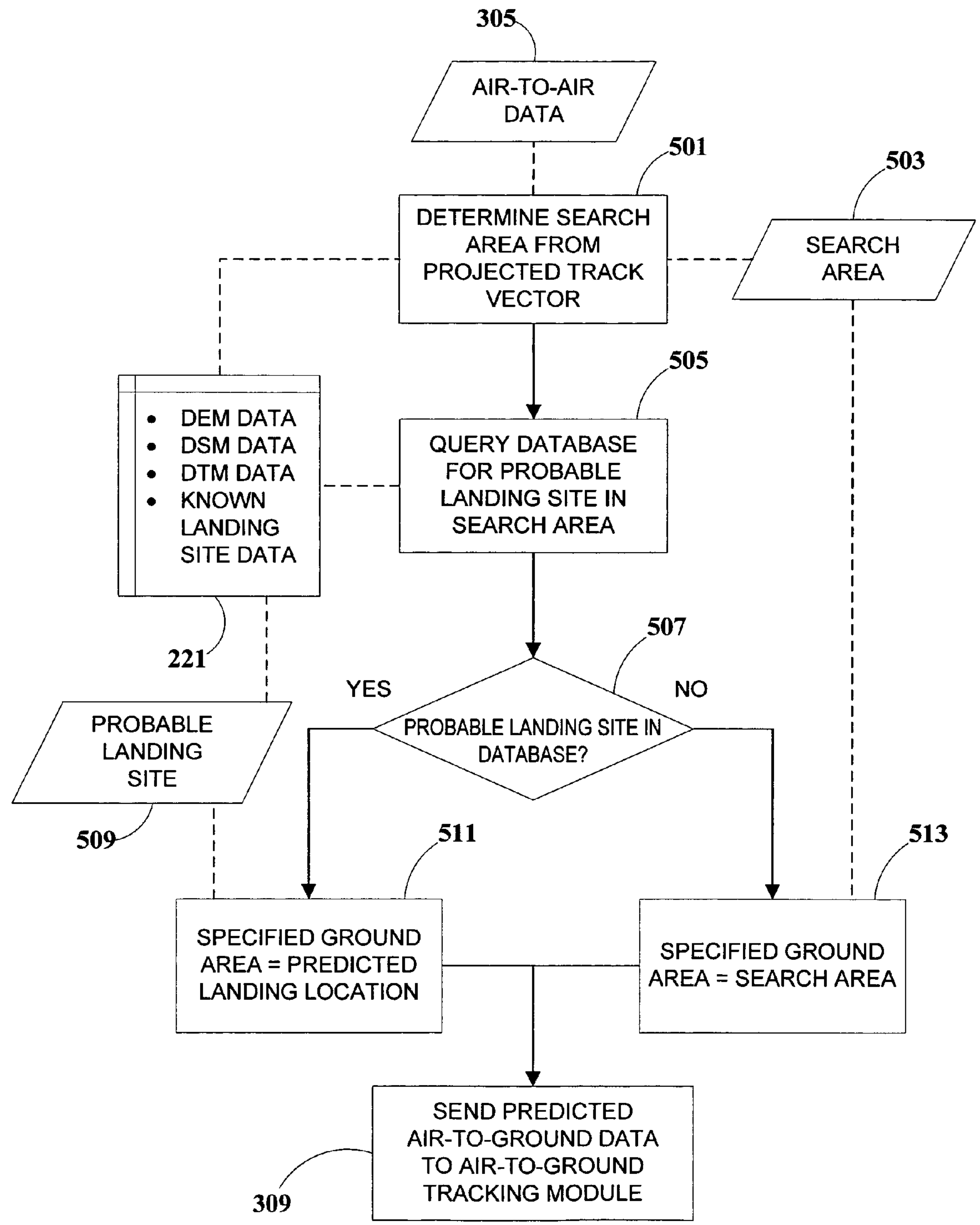
FIG. 5 is a flowchart of a method for determining a specified ground area for air-to-ground tracking of a landing tracked airborne target according to an embodiment of the present invention.

FIG. 5 is a flowchart of a method for determining a specified ground area for air-to-ground tracking of a landing tracked airborne target according to an embodiment of the present invention. A step 501 determines a search area 503 from a projected track vector obtained from air-to-air tracking data 305 (FIG. 3 and previous discussion), or derived therefrom. According to an embodiment of the present invention, the search area is computed as the intersection of the terrain surface (a non-limiting source for which is DTM data) with the projected track vector, such as within a probabilistic spatial distribution thereof.

Next, in a step 505, landing zone database 221 (FIG. 2 and previous discussions) is queried for a probable landing site in search area 503. At a decision point 507, if a probable landing site is in landing zone database 221, then in a step 511, the probable landing site is chosen for the predicted landing site, and this predicted landing site is chosen to be the specified ground area in the predicted air-to-ground data to be sent to air-to-ground tracking module 315 in method step 309 (FIG. 3 and previous discussions). If, however, there is no probable landing site in landing zone database 221, then in a step 513, the entire search area is chosen as a default for the predicted landing site, and this predicted landing site is likewise used as the specified ground area in the predicted air-to-ground data to be sent to air-to-ground tracking module 315 in method step 309.

It is to be understood that the invention is not limited in its application to the details set forth in the description contained herein or illustrated in the drawings. The invention is capable of other embodiments and of being practiced and carried out in various ways. It should be noted that the invention is not bound by the specific algorithm of processing or specific structure. Those versed in the art will readily appreciate that the invention is, likewise, applicable to any other processing or presentation with equivalent and/or modified functionality which may be consolidated or divided in another manner.

It will also be understood that the invention further contemplates a machine-readable memory tangibly embodying a program of instructions executable by the machine for executing the method of the invention.

Computer Program Product

A further embodiment of the present invention provides a computer program product for performing a method disclosed in the present application or any variant derived therefrom. A computer program product according to this embodiment includes a set of executable commands for a computer, and is incorporated within machine-readable media including, but not limited to: magnetic media; optical media; computer memory; semiconductor memory storage; flash memory storage; and a computer network. The terms "perform", "performing", etc., and "run", "running", when used with reference to a computer program product in this patent specification should be expansively construed to include the action of a computer when executing the computer program product, as if the computer program product were performing the actions. The term "computer" should be expansively construed to include any data processing apparatus capable of, or configured for, executing the set of executable commands to perform the foregoing method, including, but not limited to: computers; workstations; servers; gateways; routers; switches; networks; processors; and controllers.

Those skilled in the art will readily appreciate that various modifications and changes can be applied to the embodiments of the invention as hereinbefore described without departing from its scope, defined in and by the appended claims.

The invention claimed is:

1. An airborne tracking system comprising:

an air-to-air tracking module configured to obtain air-to-air tracking data of an airborne tracked target;

an air-to-ground tracking module configured to obtain air-to-ground tracking data of a ground-based tracked target;

a tracking coordinator module operatively coupled to said air-to-air tracking module and to said air-to-ground tracking module, and configured for:

obtaining said air-to-air tracking data;

processing said air-to-air tracking data so as to calculate a likelihood that said airborne tracked target is landing and/or that an airdrop is being made from said airborne tracked target, and to define a predicted landing location of said airborne tracked target and/or the airdrop; and responsive to a positive likelihood, enabling activation of said air-to-ground module and providing said air-to-ground module with data on the predicted landing location, said location to be used as a starting location for air-to-ground tracking after activating, thereby enabling automated coordination of tracking by said air-to-air and said air-to-ground tracking modules.

2. The system of claim 1, wherein said activating is performed in a manner selected from a group consisting of:

activating immediately;

activating after a predefined delay time;

activating after a configurable delay time;

activating according to the occurrence of a predefined event; and activating according to the occurrence of a configurable event.

3. The system of claim 1, wherein the likelihood that said airborne tracked target is landing is defined as positive when results of processing air-to-air tracking data indicate all the following criteria: the target's altitude is dropping, the target's speed has reduced below a predefined threshold, and the target has disappeared from air-to-air tracking, and wherein said predefined threshold depends on a classification of said airborne tracked target.

4. The system of claim 1, wherein said predicted landing location is calculated by said tracking coordinator module as following:

calculating projected track vector in accordance with said air-to-air tracking data;

determining a search area as an intersection or derivation thereof of a terrain surface with the projected track vector;

querying a landing zone database for one or more probable landing sites in the determined search area; and selecting at least one site among said probable landing sites as the predicted landing location.

5. The system of claim 1 wherein said air-to-ground tracking module is further configured for:

obtaining and processing air-to-ground data from said predicted landing location;

acquiring at said predicted landing location one or more candidate targets;

obtaining recognition data from said tracking coordinator module; and using the obtained recognition data for recognizing among said one or more candidate targets a ground-base target related to said tracked airborne target.

6. The system of claim 5, wherein said tracking coordinator module is operatively coupled to a landing zone database containing at least one of:

DEM data;

DSM data;

DTM data; and known landing site data.

7. The system of claim 1, wherein said air-to-ground tracking module employs at least one of:

radar infrared;

laser;

television imaging;

image processing; and optical pattern recognition.

8. The system of claim 1, wherein the activation of said air-to-ground tracking module is performed manually by an operator in response to an activating signal generated by said tracking coordinator module.

9. The system of claim 1, wherein the activation of said air-to-ground tracking module is performed automatically.

10. The system of claim 9, wherein said tracking coordinator module is further configured to report said ground-based data to said air-to-air tracking module thereby enabling a feedback for increasing an accuracy of prediction a landing location.

11. The system of claim 1, wherein at least a part of said tracking coordinator module is contained within at least one of:

said air-to-air tracking module;

said air-to-ground tracking module; and a mission command control system operatively coupled said air-to-air tracking module and/or said air-to-ground tracking module.

12. A tracking coordinator module configured for use with an airborne tracking system including an air-to-air tracking module for obtaining air-to-air tracking data of an airborne tracked target, and further including an air-to-ground tracking module for obtaining air-to-ground tracking data of a ground-based tracked target, the tracking coordinator module comprising:

an air-to-air tracking module interface configured to be operatively coupled to the air-to-air module and configured for obtaining from the air-to-air module air-to-air tracking data;

an air-to-ground tracking module interface configured to be operatively coupled to the air-to-ground module and configured for obtaining from the air-to-ground module air-to-ground tracking data;

a processor configured for:

processing said air-to-air tracking data so as to calculate a likelihood that said airborne tracked target is landing and/or that an airdrop is being made from said airborne tracked target, and to define predicted landing location of said airborne tracked target and/or the airdrop;

responsive to a positive likelihood, enabling an activation of said air-to-ground module and providing said air-to-ground module with data on the predicted landing location, said location to be used as a starting location for air-to-ground tracking after activating, thereby enabling automated coordination of tracking by said air-to-air and said air-to-ground tracking modules.

13. The tracking coordinator module of claim 12, wherein said likelihood is defined as positive when results of processing air-to-air tracking data indicate to all the following criteria: the target's altitude is dropping, the target's speed has reduced below a predefined threshold and the target has disappeared from air-to-air tracking, and wherein said predefined threshold depends on a classification of said airborne tracked target.

14. The tracking coordinator module of claim 12, wherein said predicted landing location is calculated by the tracking coordinator module as following:

calculating projected track vector in accordance with to said air-to-air tracking data;

determining a search area as an intersection or derivation thereof of a terrain surface with the projected track vector;

querying a landing zone database for one or more probable landing sites in the determined search area; and selecting at least one site among said probable landing sites as the predicted landing location.

15. The tracking coordinator module of claim 12, wherein at least a part of the tracking coordinator module is contained within at least one of:

the air-to-air tracking module;

the air-to-ground tracking module; and a mission command control system operatively coupled to air-to-air tracking module and/or the air-to-ground tracking module.

16. A method of operating an airborne tracking system comprising an air-to-air tracking module for obtaining air-to-air tracking data of an airborne tracked target, and further comprising an air-to-ground tracking module configured for obtaining air-to-ground tracking data of a ground-based tracked target, the method comprising:

obtaining air-to-air tracking data of the airborne target with the help of the air-to-air tracking module;

processing said air-to-air tracking data so as to calculate a likelihood that said airborne tracked target is landing and/or that an airdrop is being made from said airborne tracked target and to define a predicted landing location of said airborne tracked target and/or the airdrop;

responsive to a positive likelihood, enabling activation of said air-to-ground tracking module;

automatically sending said data on predicted landing location to the air-to-ground tracking module;

obtaining actual air-to-ground tracking data with the help of said air-to-ground tracking module using said predicted landing location as a starting location for air-to-ground tracking.

17. The method of claim 16, wherein said to process of said air-to-air tracking data further comprises:

computing a track for the airborne target;

determining whether said track is suspected;

if said track is suspected, then determining whether the airborne target is landing;

if the airborne target is landing, then computing said predicted air-to-ground tracking data for the ground-based target; and if the airborne target is not landing, then continuing said computing a track.

18. The method of claim 17, wherein said determining whether the target is landing comprises:

comparing an altitude of the airborne target from said air-to-air tracking data with a database containing ground elevation data of a landing site, and determining whether said altitude is dropping toward said landing site;

obtaining a speed of the airborne target from said air-to-air tracking data, and determining whether said speed is reduced;

determining whether the airborne target has disappeared from said air-to-air tracking data; and if said determining whether said altitude, said determining whether said speed, and said determining whether the target are affirmative, then signaling an airborne target landing condition.

19. The method of claim 17, wherein said computing said predicted air-to-ground tracking data for the ground-based target comprises:

deriving a projected track vector for the airborne target from said air-to-air tracking data; and modality determining a search area from said projected track vector.

20. The method of claim 19, further comprising querying a database containing data regarding a landing site for said data regarding a landing site.

21. The method of claim 19, wherein said determining a search area comprises intersecting a terrain surface with said projected track vector.

22. A computer program product comprising a non-transitory computer readable medium storing computer readable program code embodied therein, for use with an airborne tracking system comprising an air-to-air tracking module for obtaining air-to-air tracking data of an airborne tracked target, and further comprising an air-to-ground tracking module configured for obtaining air-to-ground tracking data of a ground-based tracked target, the computer program product comprising:

computer readable program code for causing the computer to obtain air-to-air tracking data of the airborne target with the help of the air-to-air tracking module;

computer readable program code for causing the computer to process said air-to-air tracking data so as to calculate a likelihood that said airborne tracked target is landing and/or that an airdrop is being made from said airborne tracked target and to define a predicted landing location of said airborne tracked target and/or the airdrop;

computer readable program code for causing the computer to responsive to a positive likelihood, enable activation of said air-to-ground tracking module;

computer readable program code for causing the computer to automatically send said data on predicted landing location to the air-to-ground tracking module;

computer readable program code for causing the computer to obtain actual air-to-ground tracking data with the help of said air-to-ground tracking module using said predicted landing location as a starting location for air-to-ground tracking.

23. A non-transitory computer readable medium storing a computer readable program executable by a computer for causing the computer to perform a process for use with an airborne tracking system comprising an air-to-air tracking module for obtaining air-to-air tracking data of an airborne tracked target, and further comprising an air-to-ground tracking module configured for obtaining air-to-ground tracking data of a ground-based tracked target, the process comprising:

obtaining air to-air tracking data of the airborne target with the help of the air-to-air tracking module;

processing said air-to-air tracking data so as to calculate a likelihood that said airborne tracked target is landing and/or that an airdrop is being made from said airborne tracked target and to define a predicted landing location of said airborne tracked target and/or the airdrop;

responsive to a positive likelihood, enabling activation of said air-to-ground tracking module;

automatically sending said data on predicted landing location to the air-to-ground tracking module;

obtaining actual air-to-ground tracking data with the help of said air-to-ground tracking module using said predicted landing location as a starting location for air-to-ground tracking.

* * * * *